US006508735B1

(12) United States Patent
Murakami et al.

(10) Patent No.: US 6,508,735 B1
(45) Date of Patent: Jan. 21, 2003

(54) HYDRAULIC CONTROL SYSTEM FOR TRANSMISSIONS

(75) Inventors: Akira Murakami, Susono (JP); Masanori Ohtake, Susono (JP); Shinichi Kojima, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 84 days.

(21) Appl. No.: 09/677,924

(22) Filed: Oct. 3, 2000

(30) Foreign Application Priority Data

Oct. 8, 1999 (JP) ............................. 11-288643

(51) Int. Cl.⁷ ..................... B06K 41/12; F16H 31/00
(52) U.S. Cl. ................. 475/120; 475/122; 475/136; 477/46
(58) Field of Search ................... 475/116, 120, 475/121, 122, 136; 477/44, 45, 46, 48, 39

(56) References Cited

U.S. PATENT DOCUMENTS

| 5,213,012 A | * | 5/1993 | Suzuki | 477/48 |
| 5,514,047 A | * | 5/1996 | Tibbles et al. | 477/46 |
| 5,853,347 A | * | 12/1998 | Aoki et al. | 477/45 |
| 5,937,729 A | * | 8/1999 | Spiess et al. | 477/48 |
| 5,961,418 A | * | 10/1999 | Taniguchi et al. | 477/46 |
| 6,090,007 A | * | 7/2000 | Nakajima et al. | 477/46 |
| 6,306,061 B1 | * | 10/2001 | Inamura et al. | 477/45 |

FOREIGN PATENT DOCUMENTS

| JP | 8-285067 | 11/1996 |
| JP | 9-159018 | 6/1997 |

* cited by examiner

*Primary Examiner*—Charles A Marmor
*Assistant Examiner*—Ha Ho
(74) *Attorney, Agent, or Firm*—Kenyon & Kenyon

(57) ABSTRACT

A hydraulic control system for a transmission including: a first transmission mechanism for transmitting a torque between rotary members and a transmission member by clamping the transmission member between the rotary members with a clamping pressure based on an oil pressure; and a second transmission mechanism for changing the transmission state of the torque by applying/releasing frictional engagement elements with an oil pressure, comprises: an oil pressure source; a first pressure regulator mechanism for regulating an oil pressure outputted from the oil pressure source, to a first oil pressure for establishing the clamping pressure for the transmission member by the rotary members; and a second pressure regulator mechanism for regulating the first oil pressure, as regulated and outputted by the first pressure regulator mechanism, to a second oil pressure for applying the frictional engagement elements.

8 Claims, 3 Drawing Sheets

HYDRAULIC CONTROL SYSTEM FOR TRANSMISSIONS

BACKGROUND OF THE INVENTION

1. Field of the Invention

The present invention relates to a hydraulic control system for a transmission in which a driving rotary member, a driven rotary member and a transmission member are controlled in their contact pressures by a higher oil pressure and in which frictional engagement elements are controlled in their applications/releases by a lower oil pressure.

2. Related Art

Generally, a discontinuous transmission capable of controlling gear ratios stepwise (or discontinuously) and automatically is provided with a gear speed change mechanism having a plurality of planetary gear mechanisms, a plurality of frictional engagement elements for changing the torque transmission lines of the gear speed change mechanism and a hydraulic control system for controlling the applications/releases of those frictional engagement elements with oil pressure. In this discontinuous transmission, the frictional engagement elements are controlled in their applications/releases to change the gear ratios by controlling the oil pressures acting on the frictional engagement elements on the basis of predetermined conditions. Since output pressure of an oil pressure source of the hydraulic control system is set higher than a line pressure or an initial pressure of the entire hydraulic circuit, there arises a problem of the so-called "shift shock" when the output pressure of the oil pressure source is used as it is as the pressure for applying the frictional engagement elements. In Japanese Patent Laid-Open No. 8-285067 (JP-A-8-285067), therefore, there is disclosed an example of a hydraulic control system for an automatic transmission, in which the output pressure of the oil pressure source is not used as the pressure for applying the frictional engagement elements before it is lowered to a predetermined level.

The automatic transmission, as disclosed in the Laid-Open, is arranged on the output side of an engine and is provided with a torque converter, a gear speed change mechanism having a plurality of planetary gear mechanisms, a plurality of frictional engagement elements and a hydraulic control system. This hydraulic control system is provided with: an oil pump as the oil pressure source; a primary regulator valve for regulating the output pressure of the oil pump to a line pressure according to the vehicle speed and the throttle opening; a manual valve for receiving the line pressure to output an oil pressure in a manner to correspond to each shift position; and a modulator valve for lowering the oil pressure, as outputted from the manual valve, in a shift position requiring an engine braking force, to a pressure to be fed to the hydraulic servos of the frictional engagement elements. When the shift position requiring the engine braking force is selected, moreover, the shift shock at the engine braking can be suppressed by feeding the frictional engagement elements with the oil pressure which is made lower than the oil pressure to be fed to the frictional engagement element to be applied when a predetermined gear stage is set.

Here, the transmission capable of controlling the gear ratios automatically is exemplified not only by the discontinuous transmission disclosed in the Laid-Open but also by a continuously variable transmission capable of controlling the gear ratios without any stage (i.e., continuously). As an example of this continuously variable transmission, there can be enumerated the belt-type continuously variable transmission which is provided with a driving pulley (primary pulley), a driven pulley (secondary pulley) and a belt. In the outer circumferences of the driving pulley and the driven pulley, there are individually formed V-shaped grooves, in which the belt is wound. On the other hand, a hydraulic control system is provided for controlling the widths of the grooves of the driving pulley and the driven pulley.

By controlling the groove width of the driving pulley, moreover, the winding radius of the belt (i.e., the effective radius of the pulley) is changed to control the gear ratio. By adjusting the groove width of the driven pulley, i.e., the clamping force for the belt, on the other hand, the tension of the belt is controlled. Thus, the contact pressures between the driving pulley and the driven pulley, and the belt can be controlled to retain the torque to be inputted to the continuously variable transmission and the torque transmission capacity according to the gear ratio.

In the belt type continuously variable transmission, on the other hand, the driving pulley and the driven pulley are restricted in their external diameters by the relation between the positions of the driving pulley and the driven pulley, and those of the parts to be arranged around the driving pulley and the driven pulley. These positional relations limit the enlargement in the control range of the gear ratio, as controlled only by the belt type continuously variable transmission. Thus, there has been proposed a layout in which the control width of the gear ratio is enlarged by arranging the belt type continuously variable transmission and a transmission having the planetary gear mechanism and the frictional engagement elements, as disclosed in the Laid-Open, in tandem in the torque transmission line leading from the engine to the wheels. In the vehicle adopting this layout, the oil pressure sources for outputting initial pressures of the oil pressure for controlling the groove width of the driven pulley and the oil pressure for controlling the applications/releases of the frictional engagement elements are desired to be common for suppressing the number of parts of the hydraulic control system and for reducing the size/weight of the hydraulic control system.

Here will be compared the belt type continuously variable transmission and the transmission having the gear speed change mechanism. The oil pressure for establishing a clamping pressure for the belt and the oil pressure necessary for applying the frictional engagement elements are made different by the difference in the power transmission manners. In the belt type continuously variable transmission, more specifically, the torque transmission capacity is retained by the frictional contacts between the driving pulley and the driven pulley of relatively smaller diameters and a portion of the belt. In the transmission having the gear speed change mechanism, on the contrary, the torque transmission capacity is retained by the frictional contact of the entirety of the annular frictional faces of the frictional engagement elements having relatively larger external diameters. As a result, the oil pressure necessary for controlling the groove width of the driven pulley in the belt type continuously variable transmission needs to be higher than the oil pressure necessary for applying the frictional engagement elements in the automatic transmission having the gear speed change mechanism.

When an output pressure of the oil pressure source is controlled to a high level and a high oil pressure (i.e., a high output pressure) is fed to the frictional engagement elements, however, the components of the hydraulic circuit leading to the frictional engagement elements are required to have the strength for resisting the high oil pressure, thus causing a problem that the hydraulic control system is enlarged in its size, increased in its weight and raised in its manufacture cost. Additionally, the output pressure of the oil pressure source acts as it is on the frictional engagement elements so that the frictional engagement elements have to be protected against the high oil pressure. As a result, the frictional engagement elements may also be enlarged in their size, increased in their weight and raised in their manufacture cost and may be damaged.

SUMMARY OF THE INVENTION

An object of the invention is to provide a hydraulic control system for a transmission, which can be reduced in size and weight and lowered in cost while preventing frictional engagement elements in advance from being damaged.

Another object of the invention is to reduce the size and weight and lower the cost for a hydraulic control system for a transmission including: a continuously variable transmission having a transmission torque influenced by a clamping pressure based on an oil pressure; and a frictional engagement elements adapted to be applied by the oil pressure for transmitting the torque.

The hydraulic control system according to the invention is applied to a transmission including a first transmission mechanism to be actuated by a higher oil pressure and a second transmission mechanism to be actuated by a lower oil pressure. The oil pressure, as established by an oil pressure source, is regulated by a first pressure regulating mechanism to a first oil pressure to be fed to the first transmission mechanism, and the first oil pressure is regulated by a second pressure regulating mechanism to a second oil pressure to be fed to the second transmission mechanism. Therefore, the first oil pressure having a relatively higher level acts on the sections from the oil pressure source to the individual pressure regulating mechanisms and on the section from the first pressure regulating mechanism to the first transmission mechanism, but the second oil pressure having a relatively lower level or a pressure below the second oil pressure acts on the remaining sections. Therefore, the portions to have a structure capable of resisting the high pressure may be reduced, so that the hydraulic control system can be reduced in size and weight as a whole to lower its cost.

On the other hand, the frictional engagement elements are actuated by the relatively low second oil pressure which is regulated by the second pressure regulating mechanism, so that the relatively high first oil pressure exerts no influence on the frictional engagement elements, thereby to avoid the dispersion, as might otherwise be caused by the dispersion of the first oil pressure, of the oil pressures for applying the frictional engagement elements in advance.

Moreover, the hydraulic control system of the invention can be constructed as one for a transmission provided with a continuously speed changing mechanism and hydraulic frictional engagement elements. The relatively high first oil pressure is fed to the continuously speed changing mechanism, whereas the relatively low second oil pressure is fed to the frictional engagement elements. With a large difference between the first oil pressure and the second oil pressure, however, the first oil pressure, as established in the first pressure regulating mechanism, is regulated by the second pressure regulating mechanism to the second oil pressure and is fed to the frictional engagement elements, so that no special pressure tight structure is required for the frictional engagement elements and for a device for controlling them to suppress the dispersion of the oil pressures in the frictional engagement elements.

The above and further objects and novel features of the invention will more fully appear from the following detained description when the same is read with reference to the accompanying drawings. It is to be expressly understood, however, that the drawings are for the purpose of illustrations only and are not intended as a definition of the limits of the invention.

DETAILED DESCRIPTION OF THE PREFERRED EMBODIMENT

Figure 2:
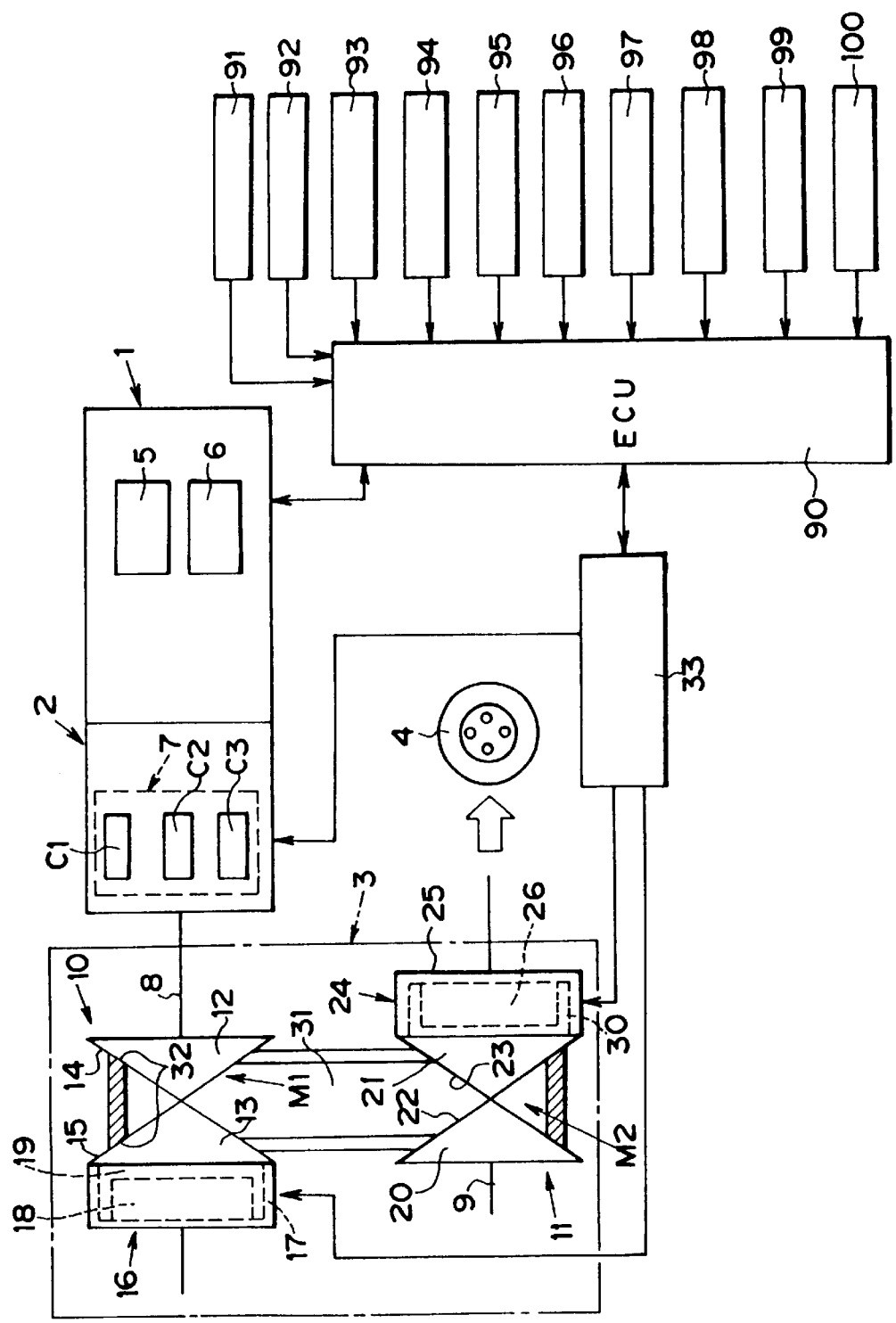
FIG. 2 is a block diagram showing a schematic construction of a vehicle to which the invention is applied.

The invention will be described in connection with its specific embodiment with reference to the drawings. First of all, one example of a power train to which the invention can be applied is shown in FIG. 2. FIG. 2 shows one example of the power train of a hybrid vehicle. In this power train, there is provided on the output side of a power source 1 a power synthesizing unit 2 having a continuously variable transmission 3 provided on its output side. In short, the power source 1, the power synthesizing unit 2 and the continuously variable transmission 3 are arranged in tandem and coupled with one another. Moreover, the power train is constructed such that the torque, as outputted from the continuously variable transmission 3, is transmitted to wheels 4.

The power source 1 is provided with an internal combustion engine 5 acting as a first power source and an electric motor 6 acting as a second power source. The internal combustion engine 5 is exemplified by a gasoline engine, a Diesel engine or an LPG engine. The internal combustion engine 5 will be shortly indicated by the engine 5 in the following description. This engine 5 is of the conventional type including an intake/exhaust unit, a fuel injection unit, an ignition unit and a cooling unit (although neither shown). The engine 5 is equipped at its intake pipe with a (not-shown) electronic throttle valve, the opening of which can be controlled on the basis of the operation of an accelerator pedal or under other conditions.

On the other hand, the electric motor 6 is a prime mover which rotates, as fed with an electric power, to output the motive power. This electric motor 6 can be exemplified by a variety of types of motors including a synchronous motor and further by an electric motor having a power generating function. In the following description, the electric motor 6 will be exemplified by one having the power generating function and will be called the "motor/generator 6".

The power synthesizing unit 2 is given a function to output the motive power (i.e., the torque) of at least one of the engine 5 and the motor/generator 6 individually or synthetically and a function to control the rotation direction (or to rotate forward and backward) of the output side of the power synthesizing unit 2. In short, this power synthesizing unit 2 has a function to switch the forward/backward runs of the vehicle. The power synthesizing unit 2 is equipped with a conventional planetary gear mechanism 7 and a plurality of conventional frictional engagement elements C1, C2 and C3. These frictional engagement elements C1, C2 and C3 can be exemplified by the so-called "wet type multi-disc" clutch or band brake.

The wet type multi-disc clutch is equipped with a plurality of annular clutch plates or clutch discs which are arranged around an input member or output member (although neither shown) of the power synthesizing unit 2. These clutch plates or clutch discs are alternately arranged in the axial direction of the input member or output member. The band brake fixes the rotation of rotary elements of the planetary gear mechanism 7 selectively and is disposed around the rotary elements. These frictional engagement elements C1, C2 and C3 are so constructed that their applications/releases are controlled by a (not-shown) hydraulic servo mechanism having an oil pressure chamber, a cylinder and a piston.

The continuously variable transmission 3 is provided with a driving shaft 8 connected in a torque transmittable manner to the output side of the power synthesizing unit 2, and a driven shaft (or a counter shaft) 9 arranged in parallel with the driving shaft 8. The driving shaft 8 is equipped with a primary pulley 10, and the driven shaft 9 is equipped with a secondary pulley 11. The primary pulley 10 is equipped with a stationary sheave 12 fixed on the driving shaft 8, and a movable sheave 13 made movable in the axial direction of the driving shaft 8. On the confronting faces of the stationary sheave 12 and the movable sheave 13, moreover, there are formed holding faces 14 and 15 which are sloped in the directions to form a V-shaped groove M1 when combined with each other.

On the other hand, there is provided a hydraulic actuator 16 for moving the movable sheave 13 in the axial direction of the driving shaft 8 to bring the movable sheave 13 and the stationary sheave 12 toward and away from each other. The hydraulic actuator 16 is equipped with an oil pressure chamber 18 formed in a cylinder 17, and a piston 19 connected to the movable sheave 13 and made movable in the axial direction of the driving shaft 8 in accordance with the oil pressure in the oil pressure chamber 18.

On the other hand, the secondary pulley 11 is equipped with a stationary sheave 20 fixed on the driven shaft 9, and a movable sheave 21 made movable in the axial direction of the driven shaft 9. On the confronting faces of the stationary sheave 20 and the movable sheave 21, moreover, there are formed holding faces 22 and 23 which are sloped in the directions to form a V-shaped groove M2 when combined with each other.

On the other hand, there is provided a hydraulic actuator 24 for moving the movable sheave 21 in the axial direction of the driven shaft 9 to bring the movable sheave 21 and the stationary sheave 20 toward and away from each other. The hydraulic actuator 24 is equipped with an oil pressure chamber 26 formed in a cylinder 25, and a piston 30 connected to the movable sheave 21 and made movable in the axial direction of the driven shaft 9 in accordance with the oil pressure in the oil pressure chamber 26.

In the groove M1 of the primary pulley 10 and in the groove M2 of the secondary pulley 11 thus constructed, a belt 31 is made to run. This belt 31 is provided on its two widthwise sides with contact faces 32 to contact with the holding faces 14, 15, 22 and 23. Here, the wheels 4 are connected in the torque transmittable manner to the output side of the driven side shaft 9.

A portion of the hydraulic circuit of a hydraulic control system 33 for controlling the power synthesizing unit 2 and the continuously variable transmission 3 will be described with reference to FIGS. 1 and 3. In this specific example, an oil pressure is established by an oil pump 34 and is regulated at first to a first line pressure, as demanded as a clamping pressure for clamping the belt 31 of the continuously variable transmission 3, and then from the first line pressure or an initial pressure to a second line pressure (or an initial clutch pressure) demanded for applying the frictional engagement elements C1, C2 and C3.

The oil pump 34 is constructed to be driven either by the engine 5 or the motor/generator 6 or by another not-shown electric motor. There is provided a primary regulator valve 35 for regulating the output pressure of the oil pump 34 to the first line pressure. This primary regulator valve 35 is provided with a spring 37 and a feedback port 38 across a spool 36 and also with a signal pressure port 39 on the side of the spring 36. With this signal pressure port 39, there is connected an output port 39B of a linear solenoid valve 39A. At a position corresponding to an intermediate portion of the spool 36, moreover, there are provided an input port 40 and a drain port 41, the communications of which are selectively opened/closed by the spool 36. With the input port 40, there are connected the oil pressure chamber 18 and the oil pressure chamber 26 in parallel with each other.

With the input port 40, moreover, there is connected an output port of the oil pump 34 via an oil passage 42. The input port 40 and the feedback port 38 are made to communicate with each other through an orifice 43. As the oil pressure is applied to the feedback port 38, a pressure for pushing the spool 36 against the spring 37 is established by the difference between the pressure receiving areas. Hence, the primary regulator valve 35 is a regulator valve for establishing in the oil passage 42 an oil pressure corresponding to the elastic force of the spring 37 and the oil pressure applied to the signal pressure port 39.

There is provided a line pressure modulator valve 44 for establishing a relatively lower second line pressure to be used for applying the frictional engagement elements C1, C2 and C3, from the initial pressure or a relatively higher first line pressure established in the oil passage 42. This line pressure modulator valve 44 is also a valve for regulating pressure by applying an output pressure as a feedback pressure to its spool. The line pressure modulator valve 44 is equipped with a spool 46 which is pushed in one axial direction by a spring 45. At a portion corresponding to an axially intermediate portion of the spool 46, there is formed an output port 47 which is opened at all times irrespective of the position of the spool 46. On the two sides in the axial direction of the spool 46 across this output port 47, there are formed an input port 48 and a drain port 49. Specifically, the communication between the input port 48 and the output port 47 is opened as the spool 46 is moved by the push of the spring 45. As the spool 46 moves toward the spring 45, on the other hand, the output port 47 is made to communicate with the drain port 49.

On the opposite side of the spring 45 across the spool 46, moreover, there is formed a feedback port 50 which is made to communicate with the output port 47 through an orifice 51. As the oil pressure is applied to the feedback port 50, moreover, there is established a pressure for pushing the spool 46 against the spring 45. Hence, the line pressure modulator valve 44 is constructed to establish in the output port 47 an oil pressure corresponding to the elastic force of the spring 45.

Moreover, the drain port 41 of the primary regulator valve 35 is connected with the drain port 49 via an oil passage 52. This oil passage 52 is provided for a fail-safe purpose to establish the oil pressure in the output port 47 even at a failure. When the line pressure modulator valve 44 fails and closes the input port 48, more specifically, the drain oil of the primary regulator valve 35 is introduced into the drain port 49 of the line pressure modulator valve 44. Thus, the drain port 49 is opened by the failure to communicate with the output port 47 so that the drain oil of the primary regulator valve 35 is outputted from the output port 47 of the line pressure modulator valve 44.

Figure 1:
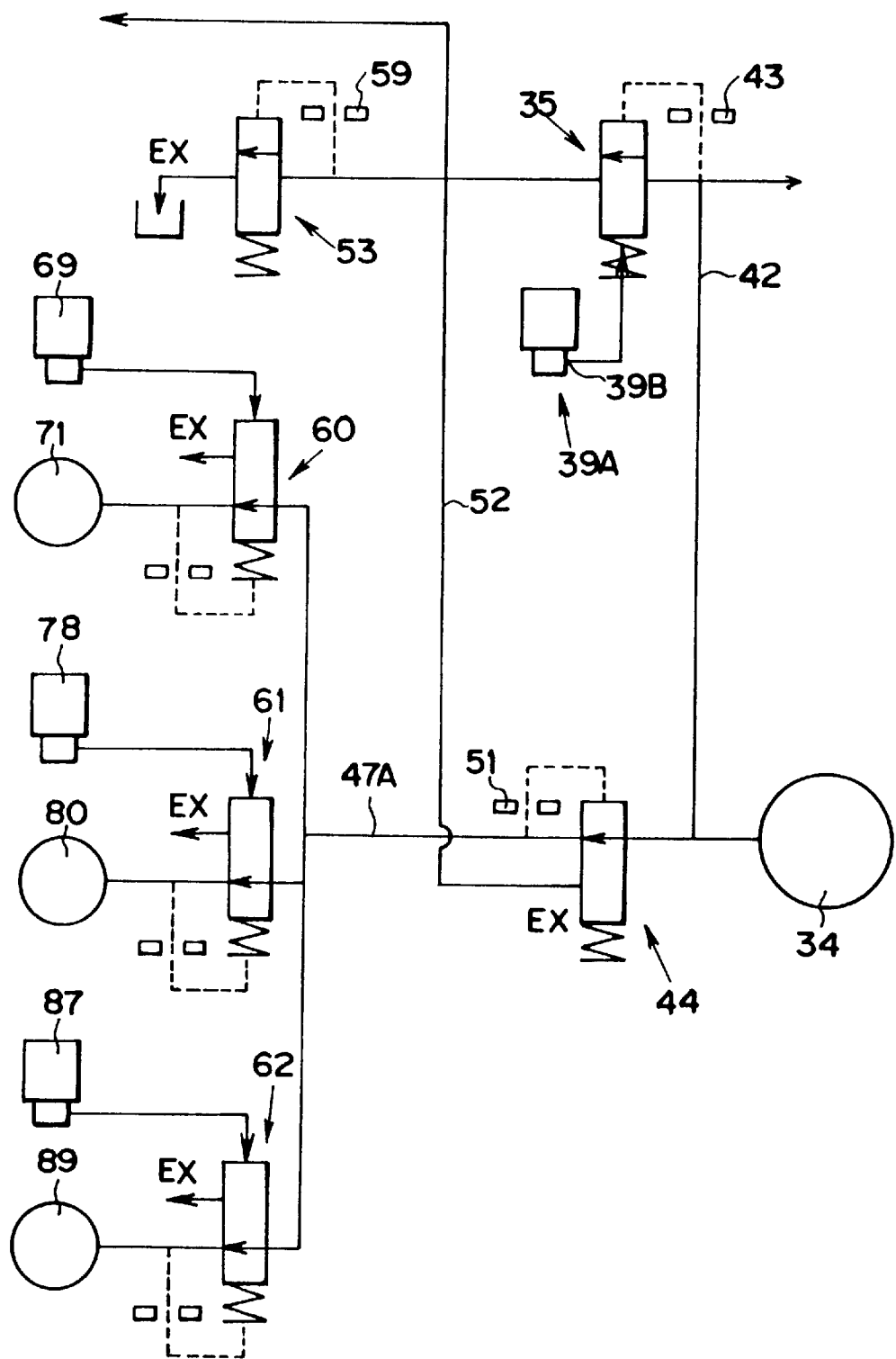
FIG. 1 is a schematic diagram of a partial circuit of one embodiment of a hydraulic control system of a continuously variable transmission of the invention.
Figure 3:
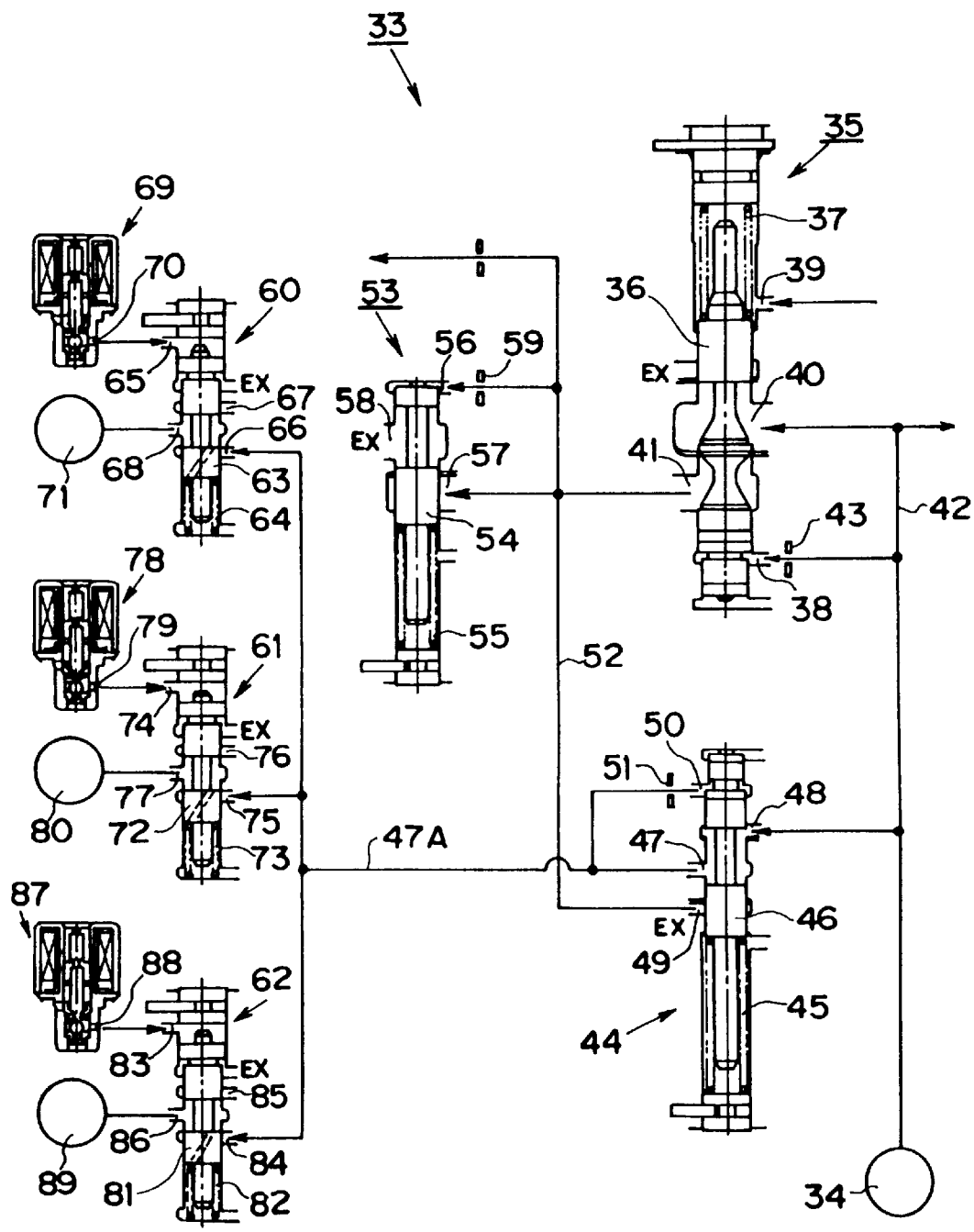
FIG. 3 is a diagram of a partial circuit of the embodiment of the hydraulic control system of the continuously variable transmission of the invention.

In FIGS. 1 and 3, on the other hand, reference numeral 53 designates a lubrication valve for regulating lubricating oil pressure, which is equipped with a spring 55 and a feedback port 56 across a spool 54. At portions corresponding to the axially intermediate portion of the spool 54, on the other hand, there are formed an input port 57 and a drain port 58, the communications of which are opened/closed by the spool 54. Moreover, the input port 57 and the feedback port 56 are made to communicate through an orifice 59, and the input port 57 is connected with the drain port 41 of the primary regulator valve 35. Hence, the lubrication valve 53 is constructed to establish in the input port 57 an oil pressure corresponsing to the elastic force of the spring 55.

Here will be described the individual regulated pressure levels of the primary regulator valve 35, the line pressure modulator valve 44 and the lubrication valve 53 thus far described. The primary regulator valve 35 has the highest regulated pressure value; the line pressure modulator valve 44 has the next high regulated pressure value; and the lubrication valve 53 has the lowest regulated pressure valve. As a result, the oil pressure, as fed to the line pressure modulator valve 44 via the aforementioned oil passage 52, is lower than a regulated pressure value of the line pressure modulator valve 44, so that an applying pressure lower than a normal oil pressure is outputted from the line pressure modulator valve 44 when it is closed by a failure.

With the output port 47 of the line pressure modulator valve 44, there are connected via an oil passage 47A pressure regulator valves (or control valves) 60 to 62 in parallel with one another. The pressure regulator valve 60 is provided for the frictional engagement element C1, having a spring 64 and a signal pressure port 65 across a spool 63. At positions corresponding to the intermediate portion of the spool 63, there are formed an input port 66, a drain port 67 and an output port 68, the communications of which are selectively opened/closed by the spool 63. With the input port 66, there is connected the output port 47 of the line pressure modulator valve 44.

For the pressure regulator valve 60, on the other hand, there is provided a linear solenoid valve 69, a signal pressure output port 70 of which is connected with the signal pressure port 65. The linear solenoid valve 69 outputs a signal pressure according to the duty ratio, i.e., the ON/OFF ratio of the electric power to be supplied. With the output port 68, there is connected an oil pressure chamber 71 for controlling the application/release of the frictional engagement element C1. Therefore, an oil pressure corresponding to the elastic force of the spring 64 and the oil pressure applied to the signal pressure port 65 is outputted from the output port 68.

On the other hand, the pressure regulator valve 61 is provided for the frictional engagement element C2 with a spring 73 and a signal pressure port 74 across a spool 72. At the positions corresponding to the intermediate portion of the spool 72, moreover, there are formed an input port 75, a drain port 76 and an output port 77, the communications of which are selectively opened/closed by the spool 72. The input port 75 is connected with the output port 47 of the line pressure modulator valve 44.

For the pressure regulator valve 61, on the other hand, there is provided a linear solenoid valve 78 having a signal pressure output port 79 connected with the signal pressure port 74. The linear solenoid valve 78 outputs a signal pressure according to the duty ratio, i.e., the ON/OFF ratio of the electric power to be supplied. With the output port 77, there is connected an oil pressure chamber 80 for controlling the application/release of the frictional engagement element C2. Therefore, an oil pressure corresponding to the elastic force of the spring 73 and the oil pressure applied to the signal pressure port 74 is outputted from the output port 77.

Moreover, the pressure regulator valve 62 is provided for the frictional engagement element C3. This pressure regulator valve 62 is provided with a spring 82 and a signal pressure port 83 across a spool 81. At positions corresponding to the intermediate portion of the spool 81, there are formed an input port 84, a drain port 85 and an output port 86, the communications of which are selectively opened/closed by the spool 81. With this input port 84, there is connected the output port 47 of the line pressure modulator valve 44.

For the pressure regulator valve 62, on the other hand, there is provided a linear solenoid valve 87 having a signal pressure output port 88 connected with the signal pressure port 83. The linear solenoid valve 87 outputs a signal pressure according to the duty ratio, i.e., the ON/OFF ratio of the electric power to be supplied. With the output port 86, there is connected an oil pressure chamber 89 for controlling the application/release of the frictional engagement element C3. Therefore, an oil pressure corresponding to the elastic force of the spring 82 and the oil pressure to be applied to the signal pressure port 83 is outputted from the output port 86.

There is provided an integrated control unit (ECU) 90 for controlling the entire vehicle of the aforementioned construction. This integrated control unit 90 is connected in mutually signal transmitting manners with the hydraulic control system 33, a (not-shown) controller for controlling the motor/generator 6, and a (not-shown) electronic control unit for controlling the engine 5. This integrated control unit 90 is constructed of a microcomputer which is composed mainly of an arithmetic processing unit (e.g., CPU or MPU), a memory unit (RAM and ROM) and an input/output interface.

To this integrated control unit 90, there are inputted: the signal of an engine speed sensor 91; the signal of an engine cooling water temperature sensor 92; the signal of an accelerator depression sensor 93; the signal of a throttle opening sensor 94; the signal of a shift position sensor 95; the signal of an input speed sensor 96 for detecting the speed of the primary pulley 10; the signal of an output speed sensor 97 for detecting the speed of the secondary pulley 11; the signal of an intake air sensor 98 for the engine 5; a signal indicating the charge of a battery 99 for supplying the electric power to the motor/generator 6, the signal of an oil temperature sensor 100 for detecting the temperature of the working fluid (or just the oil) of the hydraulic control system 33; and so on.

Moreover, the vehicle speed is determined on the basis of the signal of the output speed sensor 97. On the other hand, the target gear ratio or the target input speed of the continuously variable transmission 3 is determined on the basis of the signal of the engine speed sensor 91, the signal of the input speed sensor 96 and the signal of the output speed sensor 97. From the integrated control unit 90, on the other hand: there are outputted: a signal for controlling the engine 5; a signal for controlling the motor/generator 6; a signal for controlling the power synthesizing unit 2; a signal for controlling the continuously variable transmission 3; and a signal for controlling the hydraulic control system 33.

Here will be described the corresponding relations between the construction of this embodiment and the construction of the invention. The primary pulley 10 and the secondary pulley 11 correspond to a rotary member of the invention, and the belt 31 running on those pulleys corresponds to a transmission member of the invention, so that the continuously variable transmission 3 corresponds to a first transmission mechanism of the invention. On the other hand, the oil pump 34 corresponds to an oil pressure source of the invention, and the first line pressure (or the higher oil pressure) corresponds to a first oil pressure of the invention whereas the second line pressure (or the initial clutch pressure) corresponds to a second oil pressure (or the lower oil pressure) of the invention. Moreover, the power synthesizing unit 2 corresponds to a second transmission mechanism of the invention. The primary regulator valve 35 corresponds to a first pressure regulating mechanism of the invention, and the line pressure modulator valve 44 corresponds to a second pressure regulating mechanism of the invention.

In the vehicle thus constructed, a driving force demanded for the vehicle is judged on the basis of various signals to be inputted to the integrated control unit 90; for example, the shift position, the accelerator depression and the vehicle speed. On the basis of this decision result, moreover, there are selected modes for controlling the run/stop of the engine 5, and the drive (or power running)/stop/power-generation (or regeneration) of the motor/generator 6. To the engine 5, there are outputted signals for controlling the fuel injection unit, the ignition unit and the electronic throttle valve, for example. To the motor/generator 6, there are outputted a signal for controlling the current value to be fed at the time of driving the motor/generator 6, and a signal for controlling the regenerative braking force at the time of regenerating the motor/generator 6.

On the basis of the selection of the aforementioned modes, on the other hand, the applications/releases of the individual frictional engagement elements C1, C2 and C3 are selected, and the oil pressures in the oil pressure chambers 71, 80 and 89 are controlled. By selecting the applications/releases of the individual frictional engagement elements C1, C2 and C3, there are switched the transmission states of the torque (or the motive power) to be inputted to the continuously variable transmission 3 or the rotation directions of the output member of the power synthesizing unit 2. Here, the engaging pressures of the individual frictional engagement elements C1, C2 and C3 are controlled on the basis of the torque to be inputted to the power synthesizing unit 2.

Moreover, the integrated control unit 90 is stored with data for selecting the optimum running state of the engine 5. On the basis of these data and the running state of the vehicle such as the accelerator depression and the vehicle speed, the gear ratio of the continuously variable transmission 3 is controlled. By controlling the oil pressure in the oil pressure chamber 18, more specifically, the width of the groove M1 of the primary pulley 10 is controlled. Simultaneously with this, the width of the groove M2 of the secondary pulley 11 is controlled by controlling the oil pressure in the oil pressure chamber 26 on the basis of the torque to be inputted to the continuously variable transmission 3 and the gear ratio of the continuously variable transmission 3.

Thus, the winding radius of the belt 31 (i.e., the effective radius of the pulley) changes to control the gear ratio of the continuously variable transmission 3 and the widthwise clamping force (or the clamping pressure) for the belt 31 by the secondary pulley 11. In other words, the tension of the belt 31 is controlled. Here, the torque to be inputted to the continuously variable transmission 3 is judged on the basis of the torque of the engine 5, the torque of the motor/generator 6 and the state of the power synthesizing unit 2. Thus, the tension of the belt 31, that is, the contacting facial pressures between the belt 31, and the primary pulley 10 and the secondary pulley 11 is controlled. In other words, the belt 31 is controlled in its torque transmitting capacity so that its slip is suppressed at the time of transmitting torque.

Here, the comparison between the continuously variable transmission 3 and the power synthesizing unit 2 reveals a difference in their power transmission methods. This difference results in a difference between the oil pressure necessary for establishing the clamping pressure for the belt 31 and the oil pressure necessary for applying the frictional engagement elements C1, C2 and C3. Specifically, the continuously variable transmission 3 is constructed such that the primary pulley 10 and the secondary pulley 11 having a relatively small external diameter and a portion of the belt 31 frictionally contact to retain the torque transmission capacity. In other words, the torque transmission is effected as the primary pulley 10, the secondary pulley 11 and the belt 31 move relative to each other.

In the power synthesizing unit 2, on the contrary, the frictional engagement elements C1, C2 and C3 having relatively large external diameters frictionally contact all over their circumferences to retain the torque transmission capacity. In other words, the frictional engagement elements C1, C2 and C3 do not move relative to one another when they are applied to transmit the torque. This makes it necessary to set the oil pressure in the oil pressure chamber 26 for the secondary pulley 11 higher than that in any of the oil pressure chambers 71, 80 and 89 for applying the frictional engagement elements C1, C2 and C3.

Here will be explained the actions of the hydraulic circuit thus far described. The first explanation is made on the establishment of a line pressure (PL). The oil pressure, as outputted when the oil pump 34 is driven, is fed to the oil passage 42 so that it is applied to the input port 40 of the primary regulator valve 35. On the basis of the driving force demand such as the accelerator depression or the vehicle speed, on the other hand, the linear solenoid valve 39A is controlled to input its signal pressure to the signal pressure port 39. At the beginning, therefore, the spool 36 is pushed toward the feedback port 38 by the spring 37 and the oil pressure acting in the signal pressure port 39.

Since the oil pressure in the input port 40 also acts in the feedback port 38, moreover, the spool 36 being pushed toward the feedback port 38 receives the pressure in the opposite direction gradually. At the beginning, the input port 40 is disconnected from the output port 41 so that the oil pressure in the oil passage 42 is gradually raised as the oil pump 34 continues outputting the oil pressure. As the oil pressure in the feedback port 38, i.e., the oil pressure to be established in the oil passage 42 accordingly rises, the spool 36 moves against the action of the spring 37 and the oil pressure acting in the signal pressure port 39 thereby to open the drain port 41. In short, the oil pressure in the oil passage 42 does not rise any more so that the high oil pressure (i.e., the first line pressure), as determined on the basis of the elastic force of the spring 37 and the oil pressure acting in the signal pressure port 39, is established in the oil passage 42.

The first line pressure in this oil passage 42 is fed to the input port 48 of the line pressure modulator valve 44. While the oil pressure appearing in the output port 47 is low, the spool 46 is moved toward the feedback port 50 by the push of the spring 45, so that the input port 48 communicates with the output port 47. This causes the rise of the oil pressure not only in the output port 47 but also in the feedback port 50. As a result, the spool 46 is moved in the direction to compress the spring 45 by the push of the oil pressure in the feedback port 50 thereby to close the input port 48 and to bring the drain port 49 into communication with the output port 47. As a result, the pressure appearing in the output port 47 is the lower oil pressure (i.e., the second line pressure or the initial clutch pressure) which is determined by the elastic force of the spring 45. The second line pressure thus regulated, i.e., the line pressure for applying the frictional engagement elements C1, C2 and C3 is fed to the input ports 66, 75 and 84 of the pressure regulator valves 60, 61 and 62.

As the primary regulator valve 35 performs the pressure regulating action, on the other hand, a drain pressure is established in the drain port 41, as described hereinbefore, and is fed to the input port 57 of the lubrication valve 53. Since a pressure equal to the drain pressure is applied to the feedback port 56, the input port 57 is closed while its oil pressure is low, so that the drain pressure gradually rises. As a result, as the oil pressure in the feedback port 56 gradually rises to move the spool 54 against the elastic force of the spring 55, the input port 57 is opened to communicate with the drain port 58. Thus, the oil pressure appearing in the input port 57 does not rise any more so that the lubrication valve 53 regulates the oil pressure to a level corresponding to the elastic force of the spring 55.

Here will be described the applications/releases of the frictional engagement elements C1, C2 and C3. At first, at the time of releasing the frictional engagement element C1, the linear solenoid valve 69 is turned OFF. As a result, the spool 63 is pushed toward the signal pressure port 65 by the pushing force of the spring 64 so that it is stopped at a predetermined position. As a result, the input port 66 is closed by the spool 63, but the output port 68 and the drain port 67 communicate with each other. Thus, the oil pressure in the oil pressure chamber 71 drops to release the frictional engagement element C1.

At the time of applying the frictional engagement element C1, on the contrary, the duty ratio of the linear solenoid valve 69 is controlled on the basis of the torque to be inputted to the power synthesizing unit 2, and the signal pressure, as outputted from the linear solenoid valve 69, is inputted to the signal pressure port 65. Then, the spool 63 is pushed toward the spring 64 by the balance between the oil pressure in the signal pressure port 65 and the pushing force of the spring 64, so that the drain port 67 is closed by the spool 63, while causing the input port 66 and the output port 68 to communicate with each other. Thus, on the basis of the control of the duty ratio of the linear solenoid valve 69, the initial clutch pressure is regulated to a lower level by the pressure regulator valve 60 and is fed to the oil pressure chamber 71 thereby to apply the frictional engagement element C1.

At the time of releasing the frictional engagement element C2, on the other hand, the linear solenoid valve 78 is turned OFF. As a result, the spool 72 is pushed toward the signal pressure port 74 by the pushing force of the spring 73 so that it is stopped at a predetermined position. As a result, the input port 75 is closed by the spool 72, but the output port 77 and the drain port 76 communicate with each other. Thus, the oil pressure in the oil pressure chamber 80 drops to release the frictional engagement element C2.

At the time of applying the frictional engagement element C2, on the contrary, the duty ratio of the linear solenoid valve 78 is controlled on the basis of the torque to be inputted to the power synthesizing unit 2, and the signal pressure, as outputted from the linear solenoid valve 78, raises the oil pressure in the signal pressure port 74. Then, the spool 72 is pushed toward the spring 73 by the balance between the oil pressure in the signal pressure port 74 and the pushing force of the spring 73, so that the drain port 76 is closed by the spool 72 while providing the communication between the input port 75 and the output port 77. Thus, on the basis of the control of the duty ratio of the linear solenoid valve 78, the initial clutch pressure is regulated to a lower level by the pressure regulator valve 61 and is fed to the oil pressure chamber 80 thereby to apply the frictional engagement element C2.

At the time of releasing the frictional engagement element C3, moreover, the linear solenoid valve 87 is turned OFF. As a result, the spool 81 is pushed toward the signal pressure port 83 by the pushing force of the spring 82 so that it is stopped at a predetermined position. As a result, the input port 84 is closed by the spool 81, but the output port 86 and the drain port 85 communicate with each other. Thus, the oil pressure in the oil pressure chamber 89 drops to release the frictional engagement element C3.

At the time of applying the frictional engagement element C3, on the contrary, the duty ratio of the linear solenoid valve 87 is controlled on the basis of the torque to be inputted to the power synthesizing unit 2, and the signal pressure, as outputted from the linear solenoid valve 87, is inputted to the signal pressure port 83. Then, the spool 81 is pushed toward the spring 82 by the balance between the oil pressure in the signal pressure port 83 and the pushing force of the spring 82 so that the drain port 85 is closed by the spool 81 while providing the communication between the input port 84 and the output port 86. Thus, on the basis of the control of the duty ratio of the linear solenoid valve 87, the initial clutch pressure is regulated to a lower level by the pressure regulator valve 62 and is fed to the oil pressure chamber 89 thereby to apply the frictional engagement element C3.

As described above, the output pressure of the oil pump 34 is regulated by the primary regulator valve 35 to the higher oil pressure (or the first line pressure) to act in the oil pressure chamber 26. At the same time, the first line pressure is regulated to the initial clutch pressure by the line pressure modulator valve 44, and this initial clutch pressure is then regulated by the pressure regulator valves 61, 62 and 63 to a lower oil pressure to act in the oil pressure chambers 71, 80 and 89.

In the hydraulic circuit of the hydraulic control system 33, therefore, the oil passage, on which the high oil pressure acts, is made as short as possible (that is, the ratio of the oil passage on which the high oil pressure acts in the entire hydraulic circuit is lowered). This makes it possible to reduce the number of and make as thin as possible the components of the hydraulic circuit, which require any steps to resist the high oil pressure, thereby to make the hydraulic control system 33 small and light and to lower its cost. As the oil passage, to which the high oil pressure is transmitted, is reduced, moreover, the oil leakage in the hydraulic circuit can be suppressed to reduce the loss of the power for driving the oil pump 34.

On the other hand, the first line pressure, as regulated by the primary regulator valve 35, is lowered to an intermediate pressure by the line pressure modulator valve 44. When the individual pressure regulator valves 60, 61 and 62 fail and open, that is, when a failure occurs to leave at least one of the input ports 66, 75 and 84 open, the initial clutch pressure (or the intermediate pressure) acts in each of the oil pressure chambers 71, 80 and 89 so that it is kept away from the direct action of the first line pressure. This makes it unnecessary to provide the clutch hardware such as the frictional engagement elements C1, C2 and C3 and the hydraulic servo mechanism with any steps such as the enhancement of strength to resist the high oil pressure. As a result, it is possible to reduce the size and weight of and to lower the cost for the clutch hardware while preventing the damage of the same.

Moreover, the first line pressure is lowered by the line pressure modulator valve 44 to the intermediate oil pressure, which is further lowered by the individual pressure regulator valves 60, 61 and 62. This makes it unnecessary to take any steps to resist the high oil pressures in the individual pressure regulator valves 60, 61 and 62 so that the hydraulic control system 33 can be reduced in size and weight and lowered in cost. Since the oil pressures to be inputted to the pressure regulator valves 60, 61 and 62 is not dependent upon the first line pressure, moreover, the dispersion of the output oil pressures in the regulator valves 60, 61 and 62 due to the dispersion of the first line pressure is eliminated, and the hysteresis due to the lowering of the first line pressure is reduced. As a result, the operation response of the pressure regulator valves 60, 61 and 62 can be improved to lower the first line pressure quickly to the oil pressures for applying the frictional engagement elements C1, C2 and C3.

When the line pressure modulator valve 44 fails and closes, that is, where the input port 48 is closed by a failure, still moreover, the drain oil of the primary regulator valve 35 can be introduced into the drain port 49 of the line pressure modulator valve 44. In short, this failure causes the drain port 49 of the line pressure modulator valve 44 to communicate with the output port 47, so that the oil pressure in the drain port 41 of the primary regulator valve 35 can be inputted through the drain port 41 and the output port 47 to the input ports 66, 75 and 84 of the individual pressure regulator valves 60, 61 and 62. Even when the line pressure modulator valve 44 fails and closes, therefore, it is possible to retain the oil pressure necessary for a limp-form run (or for a retreating run) of the vehicle. Here, the oil pressures acting in the input ports 66, 75 and 84 are lower than the normal oil pressure (i.e., the initial clutch pressure).

On the other hand, the drain oil from the drain port 49 of the line pressure modulator valve 44 can be fed via the oil passage 52 to the lubrication system. As a result, the discharge of the oil pump 34 can be reduced to lower the motive power for driving the oil pump 34 according to this output reduction, thereby to improve the fuel consumption.

Here in this specific embodiment, the transmission can be exemplified by the so-called "toroidal type" continuously variable transmission. This toroidal type continuously variable transmission is provided with an input disc (i.e., a driving rotary member) and an output disc (i.e., a driven rotary member) having arcuate faces, and power rollers (i.e., transmission members) contacting with the arcuate faces of the input disc and the output disc. Moreover, the contact pressures between the input disc and the output disc, and the power rollers are controlled with the high oil pressure, which is controlled to the low oil pressure and fed to oil passages for applying the frictional engagement elements. Here, the principle of the toroidal type continuously variable transmission is based on the traction transmission utilizing the shearing stress of an oil film. This traction transmission also exemplifies the frictional contact in the invention.

On the other hand, the invention can also be applied to a vehicle on which there is mounted in place of the power synthesizing unit 2 a discontinuous transmission having gear stages stepwise (or discontinuously) controlled by applying/releasing the frictional engagement elements. Thus, in the layout in which the continuously variable transmission is arranged on the output side of the discontinuous transmission, the torque to be inputted to the continuously variable transmission is liable to rise. This makes the difference larger between the oil pressure for controlling the clamping pressure of the secondary pulley of the continuously variable transmission and the oil pressure necessary for applying the frictional engagement elements, so that the invention can function more effectively. On the other hand, the invention can also be applied to a vehicle in which the continuously variable transmission is mounted on the input side of the frictional engagement elements, i.e., in the torque transmission line from the power source to the frictional engagement elements.

Still moreover, the pressure regulator valves 60, 61 and 62 can be replaced by change-over valves having no pressure regulating function. Specifically, the initial clutch pressure, as regulated by the line pressure modulator valve 44, is employed as the oil pressures for applying the frictional engagement elements C1, C2 and C3. Here in this modification, ON/OFF solenoid valves are employed in place of the aforementioned pressure regulator valves 60, 61 and 62 and linear solenoid valves 69, 78 and 87.

Here will be summarized the advantages to be obtained by the invention. According to the invention, as has been described hereinbefore, the oil passage for transmitting the high oil pressure such as the first oil pressure other than the second oil pressure is made as short as possible in the entire hydraulic circuit, so that the hydraulic circuit components, as might otherwise require the countermeasures against the high oil pressure, can be reduced in number and made as thin as possible. This makes it possible to reduce the size and weight of and to lower the cost for the hydraulic control system. Since the first oil pressure is lowered to the second oil pressure and fed to the oil passages for applying the frictional engagement elements, on the other hand, it is unnecessary to provide the frictional engagement elements and their oil passages with the countermeasures against the high oil pressure, and it is also possible to reduce the size and weight of and to lower the cost for the same thereby to prevent their damages. Since the oil pressures for applying the frictional engagement elements are not dependent on the first oil pressure, moreover, the dispersion of oil pressures for applying the frictional engagement elements due to the dispersion of the first oil pressure is eliminated to improve the operation response of the frictional engagement elements.

What is claimed is:

1. A hydraulic control system for a transmission which has: a first transmission mechanism for transmitting a torque between rotary members and a transmission member by clamping the transmission member between the rotary members with a clamping pressure based on an oil pressure, and a second transmission mechanism for changing transmission states of the torque by applying/releasing frictional engagement elements with an oil pressure, comprising:

an oil pressure source;

a first pressure regulator mechanism for regulating an oil pressure outputted from the oil pressure source, to a first oil pressure for establishing the clamping pressure for said transmission member by said rotary members, wherein the first pressure regulator mechanism includes a first pressure regulator value having a first input port communicating with said oil pressure source for establishing said first oil pressure and a first drain port communicating selectively with said first input port for discharging an oil pressure;

a second pressure regulator mechanism for regulating the first oil pressure, as regulated and outputted by said first pressure regulator mechanism, to a second oil pressure for applying said frictional engagement elements, wherein the second pressure regulator mechanism includes a second pressure regulator value having a second input port communicating with said first input port, an output port communicating selectively with said second input port for establishing said second oil pressure, and a second drain port communicating with said output port, when said second input port is disconnected from said output port, and connected with said first drain port; and an oil passage connected with said first drain port and said second drain port for feeding an oil pressure, as outputted from said first drain port and said second drain port, to a lubrication system.

2. A hydraulic control system for a transmission accordance to claim 1, wherein the oil passage is a first oil passage, and the hydraulic control system further comprising:

hydraulic actuators disposed in said rotary members for establishing said clamping pressure;

a second oil passage for providing communications between said first pressure regulator mechanism, and said hydraulic actuators and said second pressure regulator mechanism to feed the first oil pressure, as regulated by said first pressure regulator mechanism, to said hydraulic actuators and said second pressure regulator mechanism; and a third oil passage connected with said second pressure regulator mechanism for outputting the second oil pressure, as regulated by the second pressure regulator mechanism, to said frictional engagement elements.

3. A hydraulic control system for a transmission according to claim 1, further comprising:

third pressure regulator mechanisms for further regulating said second oil pressure, as regulated by said second pressure regulator mechanism, to output the further regulated second oil pressure to said frictional engagement elements.

4. A hydraulic control system for a transmission according to claim 1, further comprising:

change-over mechanisms for feeding/blocking said second oil pressure to/from said frictional engagement elements.

5. A hydraulic control system for a transmission according to claim 1, further comprising:

a plurality of power sources connected to an input side of said second transmission mechanism, wherein said second transmission mechanism includes a power synthesizing unit for synthesizing and outputting a torque outputted from said power sources, and wherein said first transmission mechanism is connected to an output side of said power synthesizing unit.

6. A hydraulic control system for a transmission according to claim 5, wherein said plurality of power sources include both an internal combustion engine and an electric motor.

7. A hydraulic control system for a transmission according to claim 1, wherein said first transmission mechanism includes a continuously variable transmission having: a driving pulley and a driven pulley of variable effective diameters; and a belt made to run on said driving pulley and said driven pulley.

8. A hydraulic control system for a transmission according to claim 1, wherein said first transmission mechanism includes a continuously variable transmission having: a driving disc and a driven disc having toroidal faces confronting each other; and rollers held between said driving disc and said driven disc.

* * * * *